(No Model.) 2 Sheets—Sheet 1.
S. V. WEEKS.
COTTON PLANTER AND CULTIVATOR.
No. 554,013. Patented Feb. 4, 1896.
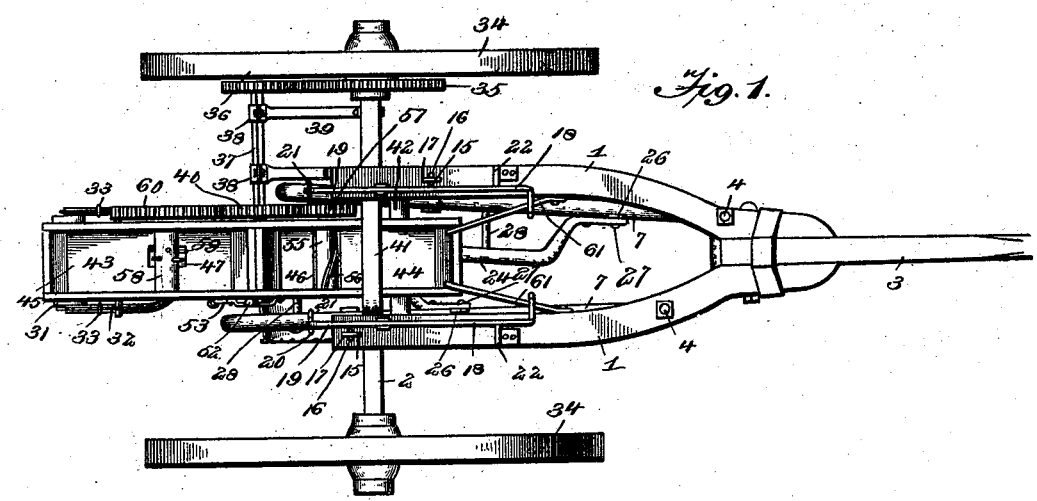
Witnesses
Inventor
Samuel V. Weeks,
By his Attorneys, (No Model.) 2 Sheets—Sheet 2.

S. V. WEEKS.
COTTON PLANTER AND CULTIVATOR.

No. 554,013. Patented Feb. 4, 1896.

Witnesses

Inventor
Samuel V. Weeks,
By his Attorneys,

UNITED STATES PATENT OFFICE.

SAMUEL V. WEEKS, OF MARION, NORTH CAROLINA.

COTTON PLANTER AND CULTIVATOR.

SPECIFICATION forming part of Letters Patent No. 554,013, dated February 4, 1896.

Application filed November 5, 1894. Serial No. 527,890. (No model.)

*To all whom it may concern:*

Be it known that I, SAMUEL V. WEEKS, a citizen of the United States, residing at Marion, in the county of McDowell and State of North Carolina, have invented a new and useful Cotton Planter and Cultivator, of which the following is a specification.

My invention relates to a combined planter and cultivator designed particularly for planting cotton, but adapted for use in planting corn or other grain; and the objects in view are to provide simple, inexpensive and efficient means for adjusting the positions of the beams for carrying the cultivator teeth or plows; to provide means for opening a furrow, discharging a fertilizer into the furrow, covering or bedding by throwing a portion of the earth into the furrow upon the fertilizer, subsequently opening a furrow for the seed, depositing the seed, and finally covering the seed and rolling the soil; to provide simple means for communicating motion to the seeding and distributing devices; to provide means for adjusting the furrow openers and closers independently, and to provide means for detaching the planting mechanism to adapt the device for use as a cultivator.

Further objects and advantages of this invention will appear in the following description, and the novel features thereof will be particularly pointed out in the appended claims.

Figure 3:
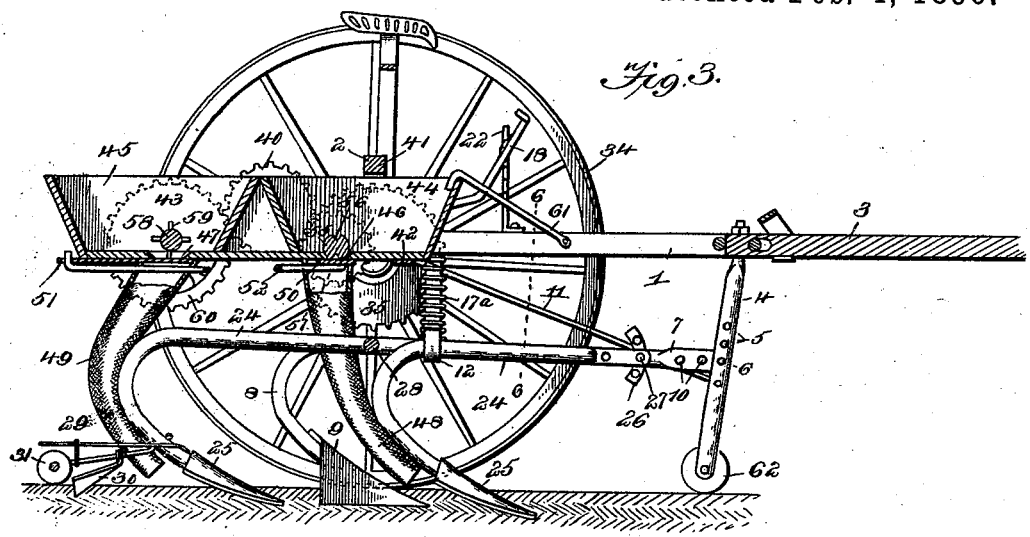
Figure 6:
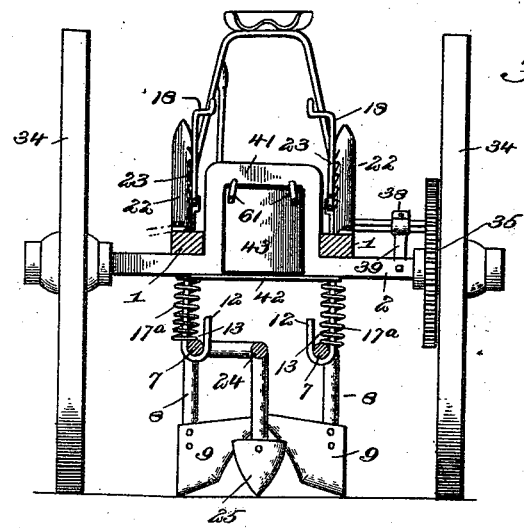
Figure 4:
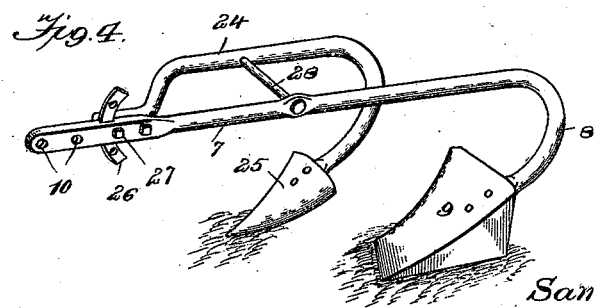

In the drawings, Figure 1 is a plan view of a machine embodying my invention. Fig. 2 is a side view. Fig. 3 is a longitudinal section. Fig. 4 is a detail view in perspective of one of the main plow-beams and the attached auxiliary beam. Fig. 5 is a similar view of the loose frame for carrying the covering and rolling devices. Fig. 6 is a partial transverse section on the line 6 6 of Fig. 3.

Similar numerals of reference indicate corresponding parts in all the figures of the drawings.

The side beams or hounds 1 are secured at their rear ends to the axle 2 and are arranged contiguous to each other at their front ends at an interval suitable for the reception of the rear end of the pivotal beam 3. Depending from the side bars, at points near their front ends, are standards 4, which are bifurcated and are provided with series of transverse perforations 5 for the reception of pivot-bolts 6. Upon these pivot-bolts and between the parallel sides or members of the standards are fulcrumed the main plow-beams 7, terminating at their rear ends in plow-standards 8, to which are attached, in the construction illustrated, the covering-plows 9. These main plow-beams are provided at their front ends with series of perforations 10 for the reception of said pivot-bolts, whereby the beams are capable of forward and rearward adjustment, and by means of the said spaced perforations in the standards said plow-beams are capable of vertical adjustment to vary the inclination of the shovels. Braces 11 extend from the lower extremities of the standards to the side bars adjacent to their points of attachment to the axle.

The plow-beams, near their rear ends, fit in vertical guides 12, having slotted or parallel-sided lower portions 13 for the reception of the beams, and shanks 15, which extend upward through openings 17 in the rear ends of the side beams and are held at the desired vertical adjustment by means of pins 16, fitting in the perforations 17. A series of these perforations is formed in each guide, whereby the vertical adjustment of these parts may be varied, and springs $17^a$ are arranged upon the guides and bear at their lower ends upon the upper sides of the plow-beams and at their upper ends against the under surfaces of the side beams. When the plow-shovels strike obstructions they are adapted to yield, thereby compressing the springs by which they are normally held in operative position. Fulcrumed upon the side beams of the frame are angular foot-levers 18, the rear arms, 19, of which are connected by means of links 20 with loops 21, which embrace the plow-beams near their rear ends. Suitable standards 22 are arranged in operative relation with the foot-levers and are provided with notches 23 in which said levers may be engaged when depressed to elevate the plow-beams.

Secured to the main plow-beams are the auxiliary beams 24, carrying the furrow-openers 25, which are located respectively in advance and in rear of the shovels carried by the main beams. The advance furrow-opener is designed to break the soil preparatory to distributing the fertilizer, and the following or rear furrow-opener is designed to reopen the furrow after it has been partially or wholly closed by the furrow-closing shovels which follow the advance-opener. In order to provide for different depths of furrow, or to provide for the adjustment of the furrow-openers independently of the main plow-beams, I employ segmental perforated plates 26 on the main beams and securing-bolts 27 for attaching the front ends of the auxiliary beams thereto. The auxiliary beams may be, and preferably are, connected with the main beams by means of connecting brace-rods 28.

Swiveled upon the lower portion of the rear auxiliary beam is a frame 29, designed to follow the rear furrow-opener and carrying the furrow-closing blades 30 and the following-roller 31. Springs 32 are attached to the said rear auxiliary beam and are connected at their free ends, by means of links 33, to the rear portions of the swiveled frame to hold the latter in operation position. Mounted upon the ends of the said axle are the ground-wheels 34, one of which is provided with a gear 35, meshing with a pinion 36 on a counter-shaft 37, said counter-shaft being mounted in bearings 38 at the rear extremities of the arms 39. The inner end of said counter-shaft is fitted with a gear 40.

The axle is provided at its center with an arch 41, and in advance thereof is a cross-bar 42, capable of angular adjustment and designed to support the front end of the hopper-frame 43, said frame extending through and fitting in the arch of the axle. In the construction illustrated in the drawings this hopper-frame is divided to form a fertilizer-box 44 and a seed-box 45, the former being in advance of the latter. Suitable rotary feeding devices are arranged in the feed-openings 46 and 47 of these boxes, and communicating with said feed-openings are the flexible chutes or conveyers 48 and 49, the former of which terminates in rear of the advance furrow-opener and the latter in rear of the rear furrow-opener. Said feed-openings are controlled by means of slides 50 and 51, connected by means of a bar 52, to which, by means of a link 53, is connected the lower end of a lever 54. By the adjustment of this lever the feed-openings may be partially or wholly closed.

The feeding devices for the fertilizer-box consist of a roll 55, mounted transversely in the box and in a seat formed contiguous to the feed-opening, said roll being provided with spiral grooves 56 for engaging the fertilizer and conveying it to the feed-opening, and a pinion 57 fixed to an extended trunnion of said roll and meshing with the gear on the inner end of the above-described counter-shaft.

The feeding devices for the seed-box consist of a roll mounted similarly to that above described, said roll 58 being provided with a spirally-disposed series of spurs or points 59, and a gear 60, fixed to one trunnion of the roll and meshing with said gear on the inner end of the counter-shaft.

Any suitable means for agitating or loosening the grain and fertilizer may be employed in connection with the above-described feeding mechanism.

The hopper-frame is held in the position shown in Figs. 1, 2, and 3 by means of hooks 61, which are pivoted to the side bars of the frame and engage the front end of said hopper-frame.

From the above description it will be seen that when it is desired to use the machine as a cultivator the hopper-frame, with its attached chutes and feeding mechanism, may be disengaged, and the plow-shovels, which are shown in the drawings, may be substituted by other preferred forms of cultivator-teeth. The standards which support the front ends of the main plow-beams are provided, at their lower ends, with small bearing-rollers 62 to support the front end of the framework.

It will be understood that other forms of gearing, such as chains or belts, may be employed instead of gear-wheels shown in the drawings, and that other specific arrangements of the gearing, to adapt the same for use in connection with machines having different forms of framework may be adopted.

Various changes in the form, proportion, and the minor details of construction may be resorted to without departing from the spirit or sacrificing any of the advantages of the invention.

Having thus described my invention, what I claim is—

1. The combination with a supporting-framework, of depending standards terminating at their lower ends in bearing-rollers, plow-beams pivotally connected at their front ends to the standards, vertical guides having slotted lower ends in which are fitted the rear portions of said beams to limit the depression of the latter, a spring coiled upon each guide and arranged in operative relation with the plow-beam to depress and hold the same in operative position, means for securing the guides at the desired vertical adjustment, and levers connected with the plow-beams by which they may be elevated against the tension of the springs, substantially as specified.

2. The combination with a supporting-framework, of depending standards, main plow-beams pivotally connected to said standards, means for adjusting the points of connection of the plow-beams with the standards, vertically-adjustable guides depending from the framework and receiving the rear portions of said plow-beams, said guides having perforated upper ends arranged above the framework and engaged by transverse pins, means for elevating the rear ends of the plow-beams, springs for depressing and holding the same in operative position, auxiliary plow-beams carried by and adjustable upon the main plow-beams, and means for securing the auxiliary beams at the desired adjustment, substantially as specified.

3. The combination with a supporting-framework, of pivotal main plow-beams carrying furrow-closing shovels, auxiliary plow-beams secured to the main plow-beams and terminating respectively in front and in rear of said furrow-closing shovels, furrow-opening shovels attached to the auxiliary beams, means for adjusting the auxiliary beams to vary the positions of the furrow-opening shovels with relation to the furrow-closing shovels, furrow-closing devices arranged in rear of the rear furrow-opener, and fertilizer and seed distributing devices discharging respectively in rear of the front and rear furrow-opening shovels, substantially as specified.

4. The combination with a supporting-framework, having a centrally-arched axle, and ground-wheels, of furrow opening and closing devices, a cross-bar arranged in front of the axle, a hopper-frame arranged in the arch of the axle and resting upon said bar, hooks attached to the framework and engaging said hopper-frame, feeding devices carried by the hopper-frame, and connections between said feeding devices and a ground-wheel, substantially as specified.

5. The combination with a supporting-framework including an arched axle and ground-wheels, of furrow opening and closing devices, a removable hopper-frame fitted at its front end in said arch of the axle and resting upon a cross-bar, means for detachably supporting the rear end of said hopper-frame in operative position, flexible chutes depending from the hopper-frame and communicating with the feed-openings thereof, feeding devices arranged contiguous to the feed-openings and including spaced gears arranged adjacent to one side of the hopper-frame, and connected, respectively, to seed and fertilizer distributers, a counter-shaft mounted in bearings on the framework and having a gear interposed between and meshing with both of the gears of the feeding devices, and means for communicating motion from the ground-wheel to the counter-shaft, substantially as specified.

6. The combination with a supporting-framework, furrow-opening devices, means for elevating the same, and planting mechanism, of a loose frame connected to a furrow-opening shovel forming one of the furrow-opening devices, furrow-closing blades carried by said frame, a roller arranged in rear of said furrow-closing blades, and springs 32 secured to the furrow-opening shovel to which the frame is connected and loosely connected to the frame to hold it in its operative position, said spring being adapted to communicate upward motion to the frame when the furrow-opening devices are elevated, substantially as specified.

In testimony that I claim the foregoing as my own I have hereto affixed my signature in the presence of two witnesses.

SAMUEL V. WEEKS.

Witnesses:
 FRED R. TIFFANY,
 J. C. BROWN.